United States Patent
Balachandran et al.

(10) Patent No.: US 8,243,779 B2
(45) Date of Patent: Aug. 14, 2012

(54) METHOD OF QUALITY-BASED FREQUENCY HOPPING IN A WIRELESSCOMMUNICATION SYSTEM

(75) Inventors: Krishna Balachandran, Morganville, NJ (US); Joseph H Kang, Belle Mead, NJ (US)

(73) Assignee: Alcatel Lucent, Paris (FR)

(*) Notice: Subject to any disclaimer, the term of this patent is extended or adjusted under 35 U.S.C. 154(b) by 1815 days.

(21) Appl. No.: 11/118,816

(22) Filed: Apr. 29, 2005

(65) Prior Publication Data

US 2006/0245470 A1     Nov. 2, 2006

(51) Int. Cl.
*H04B 1/00*      (2006.01)

(52) U.S. Cl. ........ 375/152; 375/130; 375/132; 375/133; 375/138; 375/150

(58) Field of Classification Search ............... 375/341, 375/130–136, 144–147, 152, 60, 350, 343, 375/140, 142, 355, 354, 259, 260, 267, 302, 375/322, 138, 150; 370/343; 455/555, 561
See application file for complete search history.

(56) References Cited

U.S. PATENT DOCUMENTS

| | | | |
|---|---|---|---|
| 5,491,717 A | 2/1996 | Hall | |
| 5,937,002 A | 8/1999 | Andersson et al. | 375/202 |
| 5,974,036 A | 10/1999 | Acharya et al. | |
| 6,031,864 A * | 2/2000 | Bauchot et al. | 375/133 |
| 6,130,905 A | 10/2000 | Wakayama | |
| 6,731,669 B1* | 5/2004 | Kudoh et al. | 375/133 |
| 6,965,590 B1* | 11/2005 | Schmidl et al. | 370/343 |
| 7,035,314 B1* | 4/2006 | Linsky | 375/133 |
| 7,054,301 B1* | 5/2006 | Sousa et al. | 370/343 |
| 7,280,580 B1* | 10/2007 | Haartsen | 375/138 |
| 7,620,369 B2* | 11/2009 | Molisch et al. | 455/67.11 |
| 2001/0041594 A1* | 11/2001 | Arazi et al. | 455/561 |
| 2003/0031231 A1 | 2/2003 | You et al. | 375/133 |
| 2003/0198280 A1* | 10/2003 | Wang et al. | 375/132 |
| 2004/0228267 A1* | 11/2004 | Agrawal et al. | 370/203 |
| 2005/0085197 A1* | 4/2005 | Laroia et al. | 455/101 |
| 2005/0271120 A1* | 12/2005 | Hoctor | 375/138 |
| 2006/0133543 A1* | 6/2006 | Linsky et al. | 375/341 |
| 2006/0140251 A1* | 6/2006 | Brown et al. | 375/135 |
| 2006/0209973 A1* | 9/2006 | Gorokhov et al. | 375/260 |

FOREIGN PATENT DOCUMENTS

| | | |
|---|---|---|
| GB | 2342255 | 5/2000 |
| GB | 2 379 358 | 3/2003 |
| GB | 2379358 A | 3/2003 |
| JP | 070143548 A | 1/1998 |
| WO | WO 00/69186 | 11/2000 |

OTHER PUBLICATIONS

European Search Report, Appl. No. 05257718.6-2411, (Mar. 7, 2006).

* cited by examiner

*Primary Examiner* — Hirdepal Singh
(74) *Attorney, Agent, or Firm* — Capitol Patent & Trademark Law Firm, PLLC

(57) ABSTRACT

In a wireless communications system which hops from frequency to frequency, rather than hopping according to a fixed dwell interval and a pre-determined pseudo-random hop sequence, a quality-based frequency hopping methodology is defined in which a new frequency is hopped to when the channel quality on the current frequency degrades based on the measured value or values of one or more predetermined metrics that are associated with channel quality. When triggered to hop to a next frequency, the hop-to-frequency may be the next frequency in the pseudo-random hop sequence known to both the transmitter and receiver or, in order to improve the reliability of communications, may be determined based on channel quality measurements on different potential hop-to-frequencies.

19 Claims, 3 Drawing Sheets

METHOD OF QUALITY-BASED FREQUENCY HOPPING IN A WIRELESSCOMMUNICATION SYSTEM

GOVERNMENT CONTRACT

This invention was made with Government support under Contract F30602-03-C-0079 awarded by DARPA. The Government has certain rights in this invention.

TECHNICAL FIELD

The present invention relates to wireless communications, and more particularly to frequency-hopping transmission and reception.

BACKGROUND OF THE INVENTION

Wireless networks employ transmission techniques that enable reliable communications over a channel that can experience impairments such as frequency selective fading, thermal noise, and interference from nearby communicating sources that transmit on overlapping times and frequencies. Spread spectrum techniques such as frequency hopping (FH) and direct sequence code division multiple access (DS-CDMA) help to combat these effects by spreading the signal across a wide frequency range, thus providing frequency and interferer diversity according to the amount of spreading.

From one transmission time interval to the next, FH, in particular, hops the transmission across a set of narrowband frequency carriers (or frequencies as termed henceforth) distributed over a wide spectral range. The frequency hop sequence defines the sequence of frequencies over which the device will transmit. In general, pseudo-random frequency hop sequences are employed to achieve both interferer and fading diversity gains. The duration over which the transmitter remains on a given frequency is known as the dwell interval. The receiver is assumed to be aware of the hopping sequence and must be time synchronized within the dwell interval. Realizations of pseudo random frequency hopping, referred to henceforth as random frequency hopping (RFH) are known to provide interferer and fading diversity gains and have been implemented in both commercial cellular (e.g., GSM) and military (e.g., SINCGARS) systems alike.

RFH has certain limitations, however. For instance, if the dwell interval is short, the transmitter may hop to the next frequency even if the receiver is experiencing good conditions on the current frequency and poor channel conditions (e.g., deep fade or excessive interference) on the next hop. If the dwell interval is long, the transmitter may remain on the current frequency even when conditions have degraded.

SUMMARY OF THE INVENTION

In accordance with an embodiment of the present invention, rather than hopping according to a fixed dwell interval and a pre-determined pseudo-random hop sequence, a quality-based frequency hopping transmission and reception scheme for a wireless communications system is defined that hops to a new frequency when the channel quality on the current frequency degrades based on the measured value or values of one or more predetermined metrics that are associated with channel quality. When triggered to hop to a next frequency, the hop-to-frequency may be the next frequency in the pseudo-random hop sequence known to both the transmitter and receiver or, in order to improve the reliability of communications, may be determined based on channel quality measurements on different potential hop-to-frequencies. Since both the transmitter and receiver need to know both when a frequency hop takes place as well as the hop-to-frequency, signaling between the transmitter and receiver provides exchange of information necessary for both ends to maintain communications with each other.

DETAILED DESCRIPTION

Although the following description is described as based on a generic wireless communication network or system supporting resource allocation, and will be described in this exemplary context, it should be noted that the exemplary embodiments shown and described herein are meant to be illustrative only and not limiting in any way.

Additionally where used below, the term "terminal" describes a communications device consisting of a transmitter and receiver in a wireless communication network and may be considered synonymous with mobile terminal, user equipment, subscriber, user, remote station, mobile station, access terminal, access point, base station etc.

Figure 1:
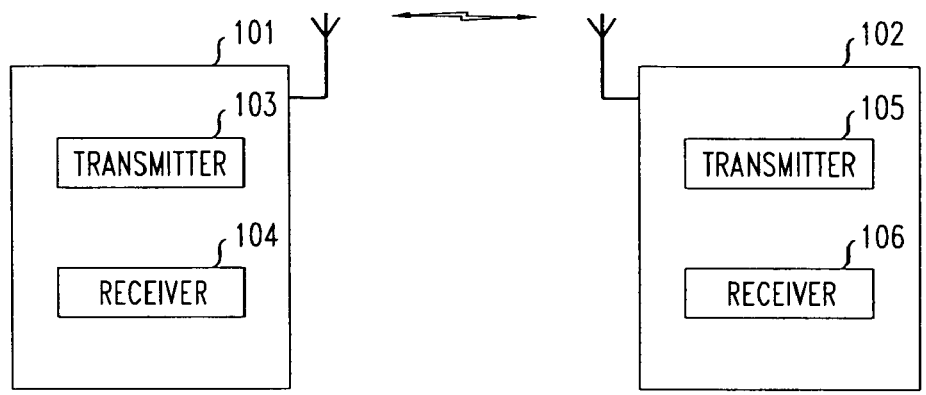
FIG. 1 is a block diagram of a prior art frequency hopping wireless communications system in which two terminals are in direct communication with each other.

FIG. 1 is a block diagram of an exemplary ad hoc wireless communications system in which terminals 101 and 102 communicate directly with each other. Terminals may be referred to as nodes in the description that follows. Terminal 101 includes a transmitter 103 and a receiver 104 while terminal 102 similarly includes a transmitter 105 and a receiver 106. As afore-noted, frequency hopping is used to combat impairments that can affect the quality of communications such as frequency selective fading, and interference from nearby sources that emit power at overlapping times and on overlapping frequencies. In the prior art, as applied to FIG. 1, transmitter 103 in terminal 101 transmits to receiver 106 in terminal 102 at a frequency $f_0$ for a fixed dwell interval, and then switches to another frequency $f_1$ for the next dwell interval. During each dwell interval, transmitter 105 in terminal 102 may be transmitting to receiver 104 in terminal 101 at a different frequency that is generally in a fixed relationship with the frequency at which it is receiving. As noted above, when each dwell interval ends, transmitter 103 hops to another frequency within a fixed set of possible frequencies according to a predetermined pseudo-random hop sequence that is known to both the transmitter and receiver.

Figure 2:
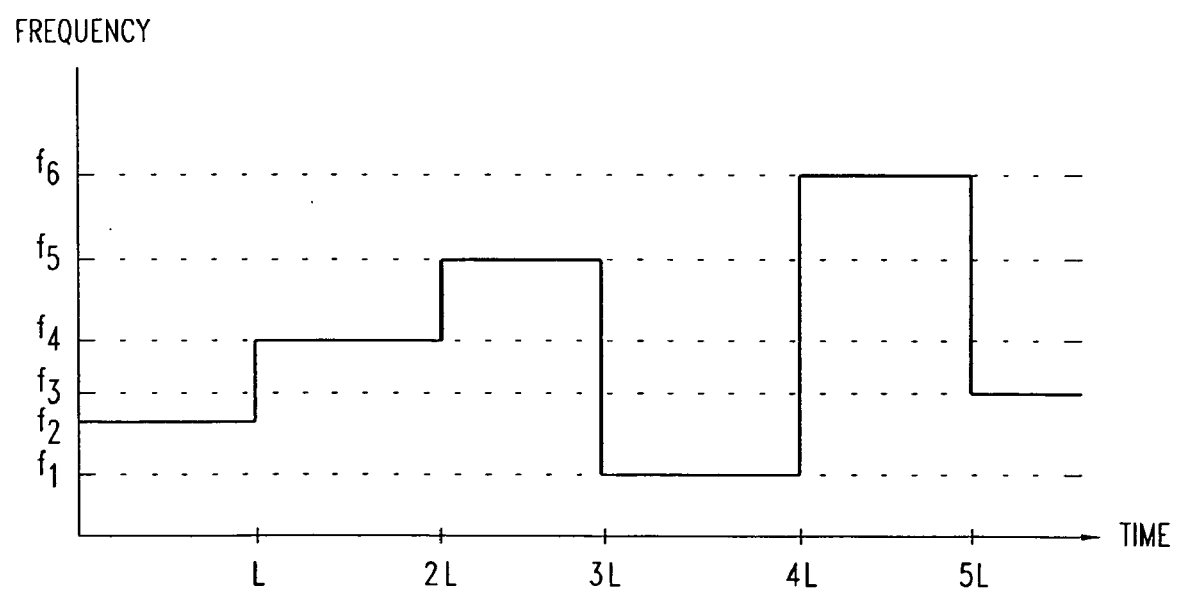
FIG. 2 is a time-graph showing the transmitting frequency versus time in the prior art system of FIG. 1.

FIG. 2 shows an example of time versus transmit frequency graph for the system of FIG. 1 that illustrates prior art frequency hopping where each dwell interval is of constant fixed duration L and each next frequency in the hop sequence is determined in accordance with a predetermined pseudo-random sequence. As afore-noted, this prior art frequency hopping methodology has certain limitations in that if the dwell interval is short, the transmitter may hop to the next frequency even if the receiver is experiencing good conditions on the current frequency and poor channel conditions (e.g. deep fade or excessive interference) on the next hop. If the dwell interval is long, the transmitter may remain on the current frequency even when conditions have degraded.

Figure 3:
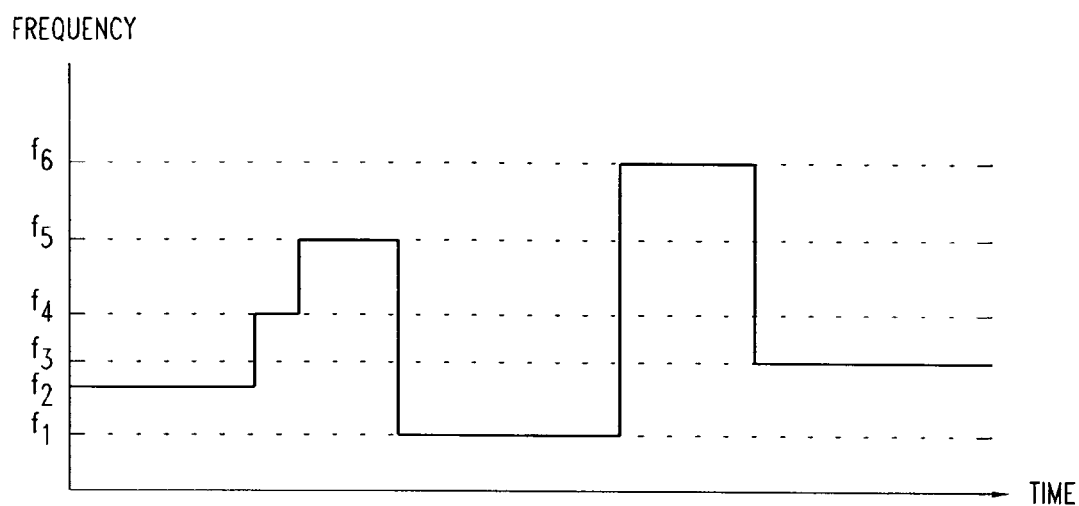
FIG. 3 is a time-graph showing the transmitting frequency versus time in accordance with an embodiment of the present invention.
Figure 4:
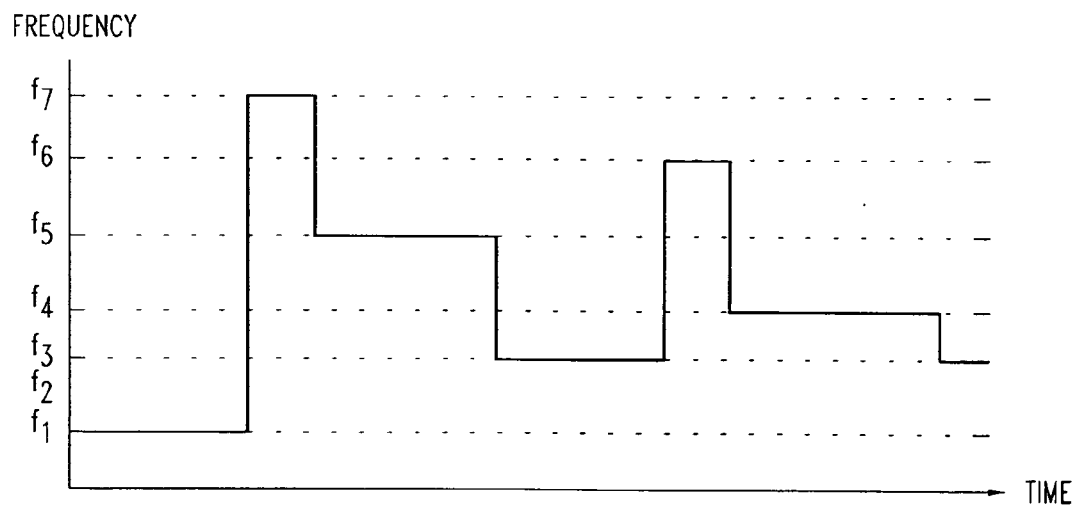
FIG. 4 is a time-graph showing the transmitting frequency versus time in accordance with a second embodiment of the present invention.

FIG. 3 shows a time versus transmit frequency graph for the system of FIG. 1 that illustrates an embodiment of the present invention in which a transition to the next frequency in a hopping sequence is triggered by the value of one or more channel quality metrics associated with prevailing channel conditions, as will be discussed in detail below. Thus, as noted, the dwell interval at each frequency is not constant but may vary at each frequency. Further, the hop-to frequency is either determined in accordance with a pseudo-random frequency hop sequence known to both the transmitter and the receiver or, alternatively, can be dynamically determined based on other factors, as will be discussed in detail below. In FIG. 3, for purposes of illustration, the hop-to frequency sequence is shown as being the same exemplary pseudo-random sequence used in FIG. 2, but with the dwell interval at each frequency being variable that is determined based on prevailing channel conditions. FIG. 4 show a time versus transmit frequency graph for an alternate embodiment wherein the dwell interval at each frequency is a variable that is determined based on prevailing channel conditions, and each hop-to frequency is also separately determined in accordance with various possible methodologies, as will be later described. Thus, in FIG. 4, a different sequence of frequencies is shown. Accordingly, there are three aspects to be considered: (a) the criteria used to trigger a frequency hop; (b) the determination of the next frequency; and (c) the signaling if applicable between the transmitter and receiver that indicates the next frequency and the time instant at which the next hop is to occur.

In accordance with this embodiment, a frequency hopping transmission and reception scheme is defined whereby the dwell interval is not fixed, but can vary according to the channel quality information associated with the current channel. This results in long dwell intervals on frequencies where good channel conditions are experienced and short dwell intervals on frequencies where poor channel conditions are experienced. Several metrics may be used to measure channel quality on individual frequencies depending on whether each frequency is used for unidirectional or bidirectional communication. Exemplary channel quality metrics that may be recorded by the transmitting or receiving node include received signal strength measurements, frame error rate (FER), bit error rate (BER), bit error probability (BEP), signal-to-noise ratios (SNR) and the signal-to-interference-plus-noise ratio (SINR). Other metrics may be defined and the examples provided herein are not intended to limiting in any way. Either instantaneous metrics or instantaneous metrics combined with previously collected metrics may be used to determine channel quality. In the case of metric combining, statistical functions such as mean, variance, median, minimum, or maximum functions may be applied across time, frequency, and/or spatial dimensions to determine channel quality. Other functions for metric combining may also be considered and the ones described previously shall not be limiting in any way. The instantaneous or combined metrics may then be compared to a single threshold or a series of thresholds to determine whether the prevailing channel quality is sufficient. Based on this determination, the transmitter and/or receiver may decide to continue transmission/reception on this frequency, move to another frequency and/or commence additional processing (e.g. measure quality on additional frequencies) to facilitate a potential move to another frequency. Optionally, after transmission has continued at a particular frequency for longer than a predetermined interval, frequency hopping to a next frequency can be automatically triggered.

Figure 5:
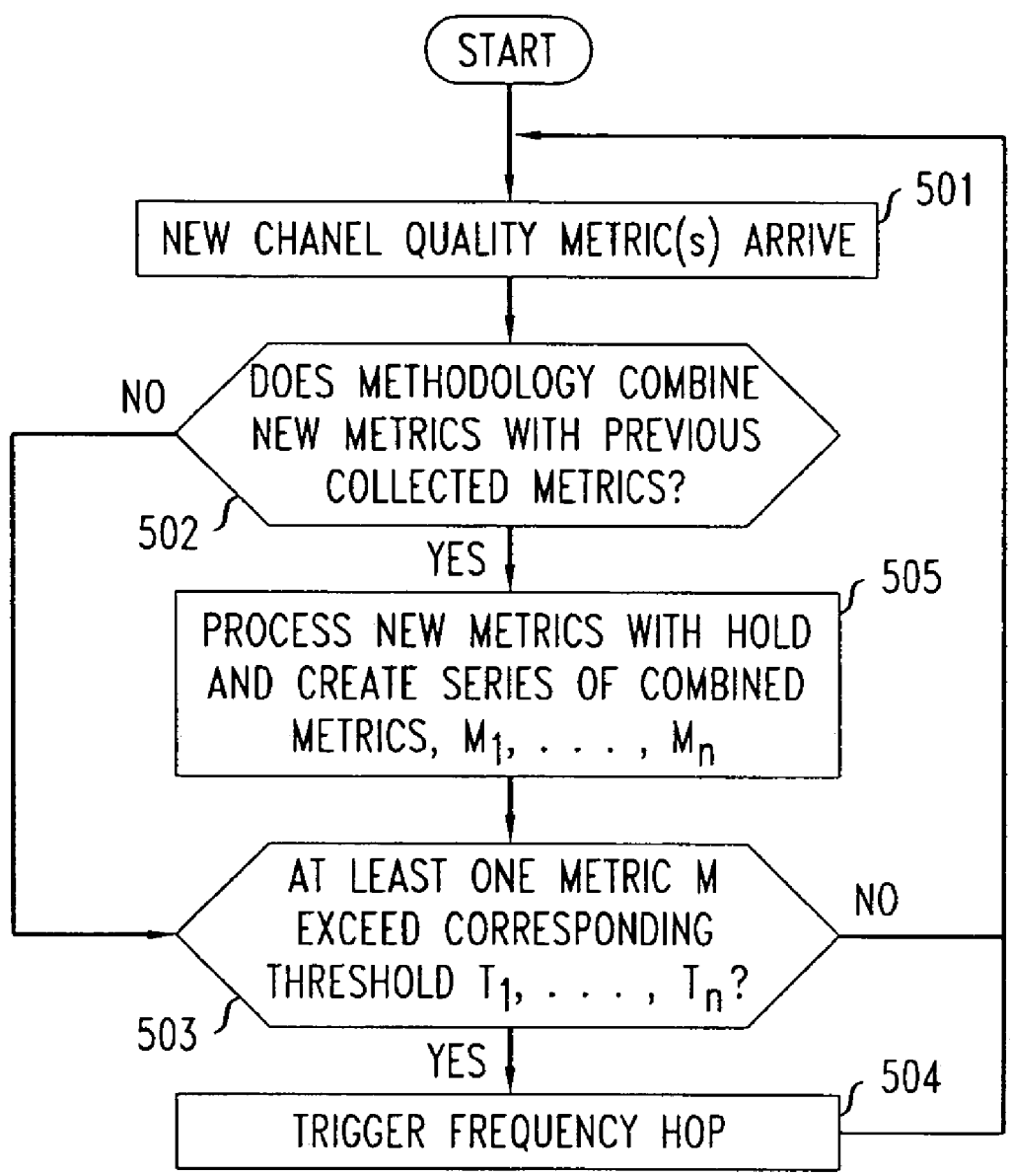
FIG. 5 is a flow chart showing the steps performed in determining when to trigger a frequency hop in accordance with an embodiment of the present invention.

With reference to the flowchart in FIG. 5, an exemplary methodology is shown for determining when a frequency hop is to be triggered based on channel conditions. At step 501, the value(s) of new channel quality metric(s) arrives. At step 502, a determination is made whether the methodology being applied combines newly arrived quality metric(s) with previously collected metrics. If there is no combining of metrics, a determination is made at step 503 as to whether a comparison of the value of at least one of such new channel quality metrics, $M_1, \ldots, M_n$, with its corresponding threshold $T_1, \ldots, T_n$, indicates insufficient quality (e.g., greater than threshold for BER metric or less than threshold for SINR metric). If insufficient quality is determined, then a frequency hop is triggered at step 504. If it doesn't, then, the system returns to step 501 to wait for the value(s) of the next channel quality metric(s) to arrive. If, at step 502, the methodology being applied does combine the value of newly arrived channel quality metrics with the values of previously collected metrics, then, at step 505, the new metric(s) are processed (e.g., by performing statistical averaging over previously collected metrics across space, time and/or frequency) and creating a series of combined metrics, $M_1, \ldots, M_n$. At step 503, then, a determination is made whether a comparison of the value of at least one of the metrics, $M_1, \ldots, M_n$, with its corresponding threshold, $T_1, \ldots, T_n$, indicates insufficient quality. Again, if insufficient quality is determined, then a frequency hop is triggered at step 504, and the methodology returns to step 501 to await the arrival of the value(s) of the next channel quality metric(s). If, at step 503, the values of none of the metrics are indicative of a degraded channel, then the methodology returns directly to step 501 to await the arrival of the value(s) of the next channel quality metric(s).

Once a hop to the next frequency is triggered based on degraded channel conditions or extended duration at a particular frequency, then a determination needs to be made as to which frequency the transmission should be hopped. There are various methodologies for the hop-to frequency determination, with each option providing a different performance depending on the operational assumptions (e.g., existing set of protocols, characteristics of channel quality information etc.) of the system.

A first methodology employs a pseudo-random sequence, known to both the transmitter and receiver, that provides a frequency offset into a fixed frequency space. For instance, if the fixed frequency space consists of N frequency channels (e.g., $f_0, f_1, \ldots, f_{N-1}$), then the hop-to frequency would be indexed according to the next value of the pseudo-random sequence. A second methodology applies to cases where the frequency space used for hopping is not fixed. Instead, the allowable frequency space for transmissions may be dynamically assessed and negotiated by the transmitter and receiver according to the prevailing channel quality and perhaps even spectrum policies. Here, the hop-to frequency may be determined by using a pseudo-random sequence to provide an offset into the available frequency space. A third methodology, which is closely related to the second methodology, employs a pseudo-random sequence as an offset into a fixed frequency space, with the transmitter selecting offsets into the pseudo-random sequence such that transmissions occur over high quality channels and/or meet policy requirements. For example, a pseudo-random sequence may indicate $f_5, f_{10}, f_2$ as the next hop-to frequencies. Rather than hopping to the next value, $f_5$, the transmitter may hop to a frequency with better quality, $f_2$, instead. In a fourth methodology the transmitter chooses a new hop-to frequency altogether (e.g., irrespective of the pseudo-random sequence). The hop-to frequency determination may be based on channel quality metrics with appropriate processing (e.g., statistical functions such as average, maximum, or minimum) applied to a series of metrics across time, frequency, or space. Candidate frequencies may be disqualified based on the combined metrics or on policy. Among the remaining candidate frequency set, greedy algorithms that assign frequencies with maximal channel quality may be selected. Alternatively, frequencies that minimally meet the transmission requirements (e.g., CINR for the desired bandwidth) may be selected. The quality-based selection algorithms described above are merely exemplary and other commonly used channel selection algorithms known to those skilled in the art can also be used.

While the use of pseudo-random hopping in the above exemplary methods allows better interferer diversity and interference averaging, deterministic hopping (e.g., cyclic hopping) may also be used. During times of transition, the transmitter may elect to transmit on both the current (i.e., hop-from) and hop-to frequencies for a short period to allow reliable communications over these transition periods.

In order for the transmitter and receiver to remain synchronized with each other when the transmitter is triggered to switch frequencies, signaling between these entities needs to occur. Depending on the trigger criteria and hop-to frequency determination, there are different methods of signaling that may be employed. These include the following: (1) signaling to trigger that channel quality has deteriorated; deteriorated quality may be indicated in multiple levels whereby processing (e.g. begin monitoring the quality on other candidate hop-to frequencies) or actions (switch to hop-to frequency) may be associated with each level; (2) signaling to indicate transition to the next hop-to frequency, a start time for that transition to occur, and/or the parameters associated with the hop-to frequency; (3) signaling to share channel quality perceived by either the transmitter or receiver on the current frequency and one or more potential hop-to frequencies; and (4) signaling that allows the transmitter and receiver to dynamically maintain a common view of an available frequency space for hop-to frequency determination.

Although the description of the embodiment above applies to the case where the use of a single frequency is assumed for communication at any given time, it is straightforward to generalize the concept of quality-based frequency hopping to a case where multiple frequencies are simultaneously used for communication (e.g., multi-tone modulation). Here, channel quality assessment applies across the set of frequencies being used at any given time for communication. Furthermore, a hop-to frequency set is determined in lieu of a single hop-to frequency and associated signaling applies to this hop-to frequency set.

While the description above applies to a single transmitter and receiver pair, it is straightforward to generalize the approach to an ad hoc neighborhood of nodes where the hop-to frequency set may be negotiated either pair-wise or across a subset of nodes. Furthermore, although described in an ad hoc neighborhood of nodes, the approach described herein can be applied to transmission in any wireless communications system.

While the particular invention has been described with reference to illustrative exemplary embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Those skilled in the art will thus readily recognize that such various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method in a wireless communications system that hops a transmission frequency of a channel from frequency to frequency after transmitting for a dwell interval at successive hopping frequencies, the method comprising the step of:

causing, by operation of a processor, the dwell interval for successive hops to be varied in duration from hop to hop as a function of a channel quality metric, wherein the dwell interval for a current frequency hop is ended when the value of the channel quality metric indicates that the channel quality at the current frequency is degraded to a predetermined level; and determining a frequency for the next frequency hop as the frequency among candidate next frequencies having a value of at least one metric associated with channel quality that is indicative of the highest channel quality.

2. The method of claim 1 further comprising the step of alternatively determining the next frequency from a next value in a pseudo-random sequence of frequencies in a fixed frequency space of a predetermined number of frequency channels.

3. The method of claim 1 further comprising the steps of:

dynamically determining an available frequency space according to measured channel quality and one or more spectrum policies associated with different candidate frequency channels; and alternatively determining the next frequency using a pseudo-random sequence to provide an offset into the determined available frequency space.

4. The method of claim 1 wherein the next frequency is alternatively determined from a value in a pseudo-random sequence of frequencies in a fixed frequency space of a predetermined number of channels, the selected value in the pseudo-random sequence being the next value in the sequence that is associated with a frequency channel which has a value of at least one metric associated with channel quality that indicates a channel quality better than a predetermined level and that meets one or more spectrum policies.

5. The method of claim 1 further comprising the step of selecting the next frequency in accordance with a value of one or more spectrum policies associated with the different candidate next frequencies.

6. The method of claim 5 wherein the value of the at least one metric is determined from the values of a plurality of metrics across time, frequency, or space.

7. The method of claim 5 wherein a candidate frequency is disqualified as the next frequency if the value of the at least one metric indicates a channel quality below a predetermined level or if a spectrum policy disqualifies it as a next frequency.

8. The method of claim 5 wherein the value of the at least one metric used for determining the next frequency is the value of one or more of the following: a received signal strength measurement; a frame error rate; a bit error rate; a bit error probability; a signal-to-noise ratio; and a signal-to-interference-plus-noise ratio.

9. The method of claim 5 further comprising the step of sending a signal to indicate the value of the next frequency.

10. The method of claim 5 further comprising the step of sending a signal to indicate a start time for a transition to that next frequency.

11. The method of claim 1 wherein the value of the at least one metric used for triggering to the next frequency is the value of one or more of the following: a received signal strength measurement; a frame error rate; a bit error rate; a bit error probability; a signal-to-noise ratio; and a signal-to-interference-plus-noise ratio.

12. The method of claim 1 wherein the value of the at least one metric used for triggering to the next frequency is the instantaneous value of the at least one metric.

13. The method of claim 1 wherein the value of the at least one metric used for triggering to the next frequency is the instantaneous value of the at least one metric combined with at least one previous value of the at least one metric.

14. The method of claim 1 wherein the value of the at least one metric used for triggering to the next frequency is compared to one or more predetermined thresholds to determine whether the channel is or is not degraded.

15. The method of claim 1 further comprising sending a signal to indicate that the next frequency is being hopped to.

16. The method of claim 1 further comprising the step of hopping from the current frequency to the next frequency when the dwell interval at the current frequency exceeds a predetermined time regardless of the value of the at least one metric associated with the channel quality at the current frequency.

17. A method in a wireless communications system that hops a transmission frequency of a channel from frequency to frequency after transmitting for a dwell interval at successive hopping frequencies, the method comprising the step of:
   causing, by operation of a processor, the dwell interval for successive hops to be varied in duration from hop to hop as a function of a channel quality metric, wherein the dwell interval for a current frequency hop is ended when the value of the channel quality metric indicates that the channel quality at the current frequency is degraded to a predetermined level;
   dynamically determining an available frequency space for the next frequency according to measured channel quality and one or more spectrum policies associated with different candidate frequency channels; and
   determining the next frequency using a pseudo-random sequence to provide an offset into the determined available frequency space.

18. A method in a wireless communications system that hops a transmission frequency of a channel from frequency to frequency after transmitting for a dwell interval at successive hopping frequencies, the method comprising the step of:
   causing, by operation of a processor, the dwell interval for successive hops to be varied in duration from hop to hop as a function of a channel quality metric, wherein the dwell interval for a current frequency hop is ended when the value of the channel quality metric indicates that the channel quality at the current frequency is degraded to a predetermined level; and
   determining a frequency for the next frequency hop from a value in a pseudo-random sequence of frequencies in a fixed frequency space of a predetermined number of channels, the value in the pseudo-random sequence being the next value in the sequence that is associated with a frequency channel which has a value of at least one metric associated with channel quality that indicates a channel quality better than a predetermined level and that meets one or more spectrum policies.

19. A method in a wireless communications system that hops a transmission frequency of a channel from frequency to frequency after transmitting for a dwell interval at successive hopping frequencies, the method comprising the step of:
   causing, by operation of a processor, the dwell interval for successive hops to be varied in duration from hop to hop as a function of a channel quality metric, wherein the dwell interval for a current frequency hop is ended when the value of the channel quality metric indicates that the channel quality at the current frequency is degraded to a predetermined level.

* * * * *